Figure 1:
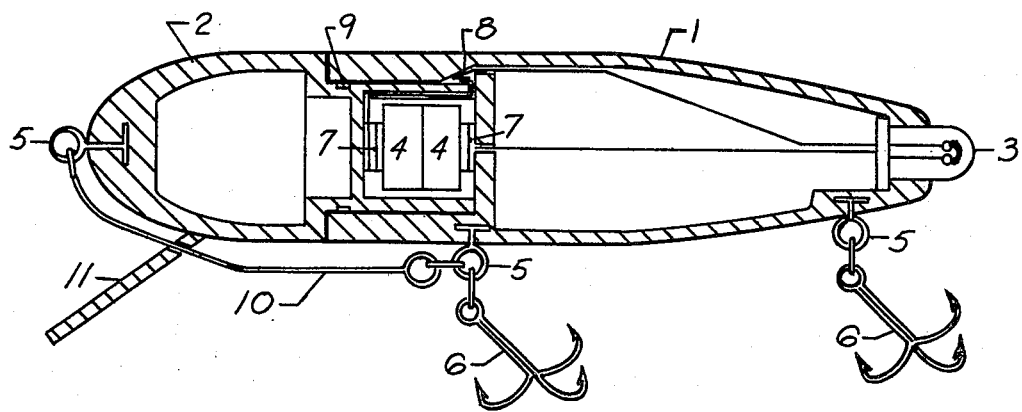

United States Patent [19]

Helling

[11] 4,426,803

[45] Jan. 24, 1984

[54] ILLUMINATED FISHING LURE

[76] Inventor: Danie W. Helling, 516 W. 3rd St., Washington, Mo. 63090

[21] Appl. No.: 413,715

[22] Filed: Sep. 1, 1982

[51] Int. Cl.³ ............................................. A01K 85/00
[52] U.S. Cl. ..................................................... 43/17.6
[58] Field of Search ......................................... 43/17.6

[56] References Cited

U.S. PATENT DOCUMENTS

| | | | |
|---|---|---|---|
| 2,190,791 | 2/1940 | Larson | 43/17.6 |
| 2,458,611 | 1/1949 | Long | 43/17.6 |
| 2,500,442 | 3/1950 | Waite | 43/17.6 |
| 2,536,408 | 1/1951 | Addicks | 43/17.6 |
| 3,969,839 | 7/1976 | Ziegler | 43/17.6 |
| 4,250,650 | 2/1981 | Fima | 43/17.6 |

FOREIGN PATENT DOCUMENTS

| | | | |
|---|---|---|---|
| 1441640 | 5/1966 | France | 43/17.6 |
| 449736 | 7/1936 | United Kingdom | 43/17.6 |

*Primary Examiner*—Gene P. Crosby
*Attorney, Agent, or Firm*—Glenn K. Robbins

[57] ABSTRACT

A fishing lure having a light therein which may be switched off by tension on the line when the lure is snagged. The lure is constructed of a hollow plastic body comprising a head section slidably interfitted with a tail section. A light bulb in the end of the tail section is energized by a battery and switch means which is interrupted to break the circuit when a fish hook on the tail section is snagged. Tension on the fish line connected to the head section moves the two sections apart to break the circuit. A stop limits the relative movement between the body sections.

8 Claims, 1 Drawing Figure

ILLUMINATED FISHING LURE

BACKGROUND OF THE INVENTION

Various types of artificial lures have been provided in the past with a light bulb to illuminate the lure and attract fish for night-time fishing or fishing in murky waters. Such lures, while containing means for switching the light off when the lure is stored, do not have means for de-energizing the light when the lure is snagged in brush or other obstacles. The loss in the life of the battery during the time necessary to retrieve the lure may be considerable.

SUMMARY OF THE INVENTION

By means of this invention there has been provided an artificial lure with light emission capability which can be energized in use and de-energized by tension on the line when the lure is snagged upon an obstacle or the like or manually de-energized when not in use.

The lure in its simplest form is made in the form of a hollow artificial fishing plug body comprised of two slidable body sections which may be pulled slightly apart from one another to open a switch in an interior electrical circuit connecting an internal battery with an illumination source such as a miniature lamp or light bulb. The lure is provided with hooks in a rear body section which restrains the rear portion of the plug when snagged against a tension force applied on the fish line by the fisherman. Such force causes a relative sliding movement between the two body sections to open a switch and turn off the light. A stop mechanism is used to prevent the two sections from being pulled apart more than the necessary amount to cause the switch to open. The two sections are provided with an O-ring seal to seal the interior of the body and present a water-tight seal.

The artificial lure is typically embodied in the form of a hollow bass plug fishing lure or the like. The body is desirably formed in a forward hollow head section having an eyelet for attachment to a fishing line. A rear hollow main body and tail section is connected in sliding male-female or telescoping relation to the head section to provide a slight degree of relative longitudinal sliding movement to provide for the necessary movement to open and close a switch formed by electrical switch contacts supported on the head and tail sections.

The main body and tail section supports an internal battery and electrical circuit leads to a lamp mounted in the end of the tail section. Treble hooks are likewise mounted on the body and tail section in the usual fashion.

A stop mechanism is provided to limit the sliding movement between the head and tail sections. In its simplest form this is embodied in a stay rod or support leader connected between eyelets in the head and tail sections which permits a slight degree of sliding movement between the head and tail sections sufficient to operate the switch between open and closed positions.

The lure is rugged in construction and the light may be simply switched on and off by the user by pushing the sections of the plug body together or pulling them apart. The battery may be easily replaced by removing the stop stay or leader to disassemble the body.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

FIG. 1 is a view in section through the longitudinal axis of the fishing lure.

DESCRIPTION OF THE INVENTION

The illuminated fishing lure of this invention is shown in FIG. 1 as comprising a main body and tail section 1 slidably interfitted with a head section 2. The two sections are hollow and may be simply formed from molded polystyrene or other plastics in half sections which are then fitted together.

A light bulb 3 is seated in the rear tapered end of the tail section 1 and is connected by appropriate leads to a pair of disc-shaped batteries 4. The batteries are seated in a cup-shaped portion of the head section which fits slidably within a forward oppositely disposed cup-shaped portion of the main body and tail section 1. The interfit of the two opposed cup-shaped portions provide a sliding fit to enclose and support the batteries and enable a simple replacement when the two sections forming the fishing lure body are removed from one another.

Eyelets 5 are affixed to the body and tail section 1 and the forward end of the head section 2. The two rear eyelets are employed to anchor conventional treble hooks 6 while the forward eyelet is employed for affixation to a fishing line.

The electrical circuit to energize the lamp 3 is established by electrical leads from battery contacts 7 and a switch 8 having relatively moveable slide contacts on the exterior of the cup-shaped portion of the head section 2 and the interior of the cup-shaped portion of the main body and tail section 1. As the head and body sections are axially moved with respect to one another the switch contacts are opened and closed.

In order to provide a water-tight seal for the telescopic or male-female interfit of the head and body section an O-ring 9 is seated in the exterior of the periphery of the head section. This O-ring bears resiliently against the opposed inner wall of the body section and provides a seal while permitting sliding movement.

In order to provide a stop to prevent the head section from being pulled completely away from the main body and tail section while the lure is being fished a stay or leader 10 is connected to the head eyelet and the forward hook eyelet 5. The stay may be of wire which can be disconnected from the eyelets when the head section and body section are desired to be completely disconnected for ultimate battery replacement.

A bill or spoon 11 is connected to the underside of the head section to provide deep running action to the lure. The stay or leader is passed through an opening in the bill which acts as a guide for the stay.

USE

The fishing lure of this invention is very simply employed. When not in use the main body and tail section 1 and the head section are simply pulled apart to open the contacts of the switch 8. This opens the electrical circuit to the lamp 3 to conserve the life of the battery.

When the lure is used, it is simply attached to a fishing line and is employed in the familiar manner. It may be employed without the lamp energized for day-time fishing as desired. When the lamp is desired to be energized for night-time fishing or fishing in the day-time in murky or poorly lit waters, for example, the lamp is energized by pushing the main body and tail section 1 and the head section 2 together. This operation closes the contacts of the switch 8 to energize the lamp.

If during the fishing operation the lure becomes snagged on brush, rocks or other obstacles, the fisherman may switch off the lamp to conserve battery life until the lure is disengaged which may take a considerable time. This is simply accomplished by exerting tension on the fish line connected to the head section 2 sufficient to pull it slightly away from the main body and tail section 1. This action separates the contacts of the switch 8 to open the electrical circuit and turn off the lamp 3. The limit stop provided by the stay or leader 10 prevents the two sections from being pulled apart while permitting the necessary sliding movement to open and close the switch.

When battery replacement is desired, the stay or leader 10 is disconnected from one of the eyelets 5 which anchor it. The head section and the main body and tail section are then pulled apart and the batteries are replaced. The sections are then refitted and the stay 10 is reconnected.

Various changes and modifications may be made within this invention as will be apparent to those skilled in the art. Such changes and modifications are within the scope and teaching of this invention as defined in the claims appended hereto.

What is claimed is:

1. A light emitting fishing lure comprising a body, said body comprising at least a first and second section slidably interfitted with one another, one of said sections supporting a battery and the other section supporting a light means, lead means providing an electrical circuit extending between said battery and light means, switch means to open and close said circuit operable to relative sliding movement between said first and second sections to open and close said lead means, said second section being provided with fish hook members and said first section being provided with an eyelet for attachment to a fish line, said first section being moveable to a switch open position responsive to tension on the first section such as by pulling on the fish line when said second section is restrained as by a snagging of the fish hook member.

2. The fishing lure of claim 1 in which said light means comprise a light bulb mounted in a tapered end portion of said second section.

3. The fishing lure of claim 1 in which stop means are provided for limiting the relative sliding movement between the first and second sections.

4. The fishing lure of claim 3 in which said stop means comprises an elongated stay member anchored at opposed ends to said first and second sections.

5. The fishing lure of claim 4 in which said stay member is anchored at a forward end to said fish line eyelet and a second eyelet anchored to said second section.

6. The fishing lure of claim 1 in which said sections are slidably interfitted within one another in a close sliding fit and one of said sections has a seated wall portion which supports a flexible O-ring biased in sealing relation against an opposed wall portion in the other section to provide a water-tight seal.

7. The fishing lure of claim 1 in which said switch means comprises a first contact member supported on a wall portion of one of said sections and a second contact member supported on an opposed wall portion of the other section, said contact members being moveable into and out of electrical contact with each other responsive to said sliding movement between said sections.

8. The fishing lure of claim 1 in which one of said sections is provided with an interior cup-shaped portion receiving said battery means thereon and the other section is provided with an opposed congruent interior cup-shaped portion slidably fitted in opposed nesting relation over said first mentioned cup-shaped portion to restrain said battery means.

* * * * *